(No Model.)

J. A. CAMPBELL.
PRODUCE BARREL HEAD.

No. 467,870. Patented Jan. 26, 1892.

WITNESSES:
Helmuth Holtz
Percy D. Parks

INVENTOR
James A. Campbell
BY
W. R. Stringfellow
ATTORNEY.

UNITED STATES PATENT OFFICE.

JAMES A. CAMPBELL, OF NEW ORLEANS, LOUISIANA, ASSIGNOR OF TWO-THIRDS TO GEORGE P. HARRISON AND PIERE MICHEL, OF SAME PLACE.

PRODUCE-BARREL HEAD.

SPECIFICATION forming part of Letters Patent No. 467,870, dated January 26, 1892.

Application filed December 23, 1889. Serial No. 334,598. (No model.)

*To all whom it may concern:*

Be it known that I, JAMES A. CAMPBELL, a citizen of the United States of America, residing at New Orleans, in the parish of Orleans, State of Louisiana, have invented certain new and useful Improvements in Produce-Barrel Heads, of which the following is a specification, reference being had to the accompanying drawings, wherein—

Figure 1:
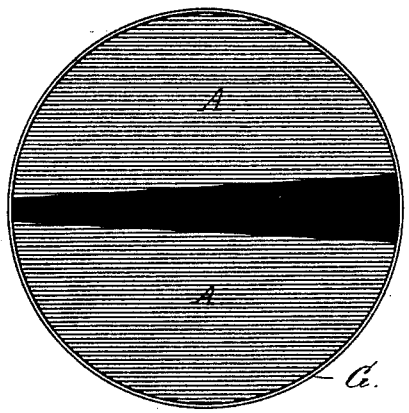
Figure 2:
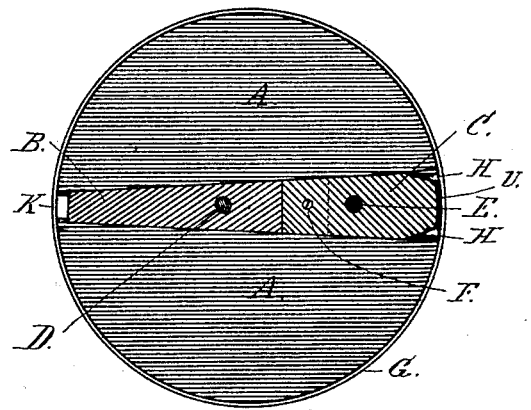
Figure 3:
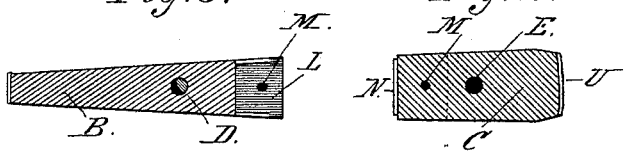
Figure 4:
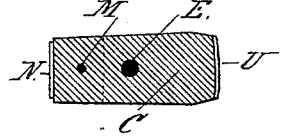
Figure 5:
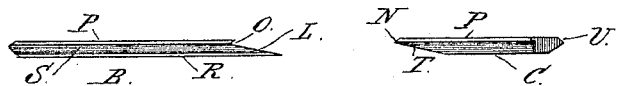
Figure 6:

Figure 1 represents the sections of a barrel-head. Fig. 2 represents a barrel-head with wedges inserted as embodied in my invention. Fig. 3 represents a plan view of one of the wedges. Fig. 4 represents a plan view of the other wedge. Fig. 5 represents a side view of the wedge shown in Fig. 3. Fig. 6 represents a side view of the wedge shown in Fig. 4.

Similar letters indicate corresponding parts in the different figures.

Referring to the drawings, A A designate sections of a barrel-head inserted therein, as shown in Fig. 1, and B and C designate wedges adapted to be placed between said sections in a produce-barrel. The said wedges, which are of tapering form have in their upper faces the finger-holes D and E, respectively, for convenience in manipulating these parts. The corners of the wedge C are cut away at its larger end, so as to leave openings, as H H, in the head of the barrel for ventilation. The wedge B has an inclined face L on its larger end corresponding with an inclined under end of the wedge C and the said inclined faces having coinciding openings M for the insertion of a nail, screw, or other fastening device. A tongue N on the smaller end of the wedge C is adapted to fit in a groove or notch O in the larger end of the wedge B, so that a close joint will be formed when the wedges are in place. The wedge B is provided on its sides with upper and lower flanges P and R, respectively, while the wedge C has a single flange on each side, as P', the said flanges P' being, when the wedges are united, continuations of the flanges P.

In using the wedges, the wedge B is first inserted by placing it in the widest part of the opening in the head and having its flanges on the upper and lower sides of the sections A A when it is pushed toward the narrow end, leaving a small space, as K, open at its end for the same purpose as the spaces H H. The wedge C is then placed in position so that the tongue N enters the groove O, and the wedge is operated so that the beveled end U thereof is permitted to enter the chines of the barrel, when it is driven therein.

If other than a produce barrel is to be headed, the wedge B is of such length that its smaller end will be in the chines when the beveled end U of the other wedge is in the chine on the oppose side of the barrel.

It will be seen that the device thus described is simple in character, easily operated, and of comparatively trifling cost, all of which features are important considerations in an article of this kind.

Having thus described my invention, what I desire to claim and secure by Letters Patent is—

1. A barrel-head wedge consisting of two parts of tapering form, one of said parts having an upper and a lower flange on both of its sides and the other part having a single flange on each side and cut-away portions on the corners of one end, said parts being combined substantially as described.

2. A barrel-wedge consisting of two wedges, one having upper and lower flanges on both of its sides, an inclined end on its upper face, and a notch or groove therein, the other having on its under face an inclined end portion, with a tongue and cut-away portions at the corners of its larger end and an upper flange on its sides, said parts being combined substantially as described.

In testimony whereof I affix my signature in presence of two witnesses.

JAMES A. CAMPBELL.

Witnesses:
HELMUTH HOLTZ,
PERCY D. PARKS.